June 9, 1964     A. C. FLEURY     3,136,505
AMPHIBIOUS AIRPLANE

Filed July 24, 1961     3 Sheets-Sheet 1

ALEX C. FLEURY
*INVENTOR.*

BY Clarence M. Tuck
ATTORNEY

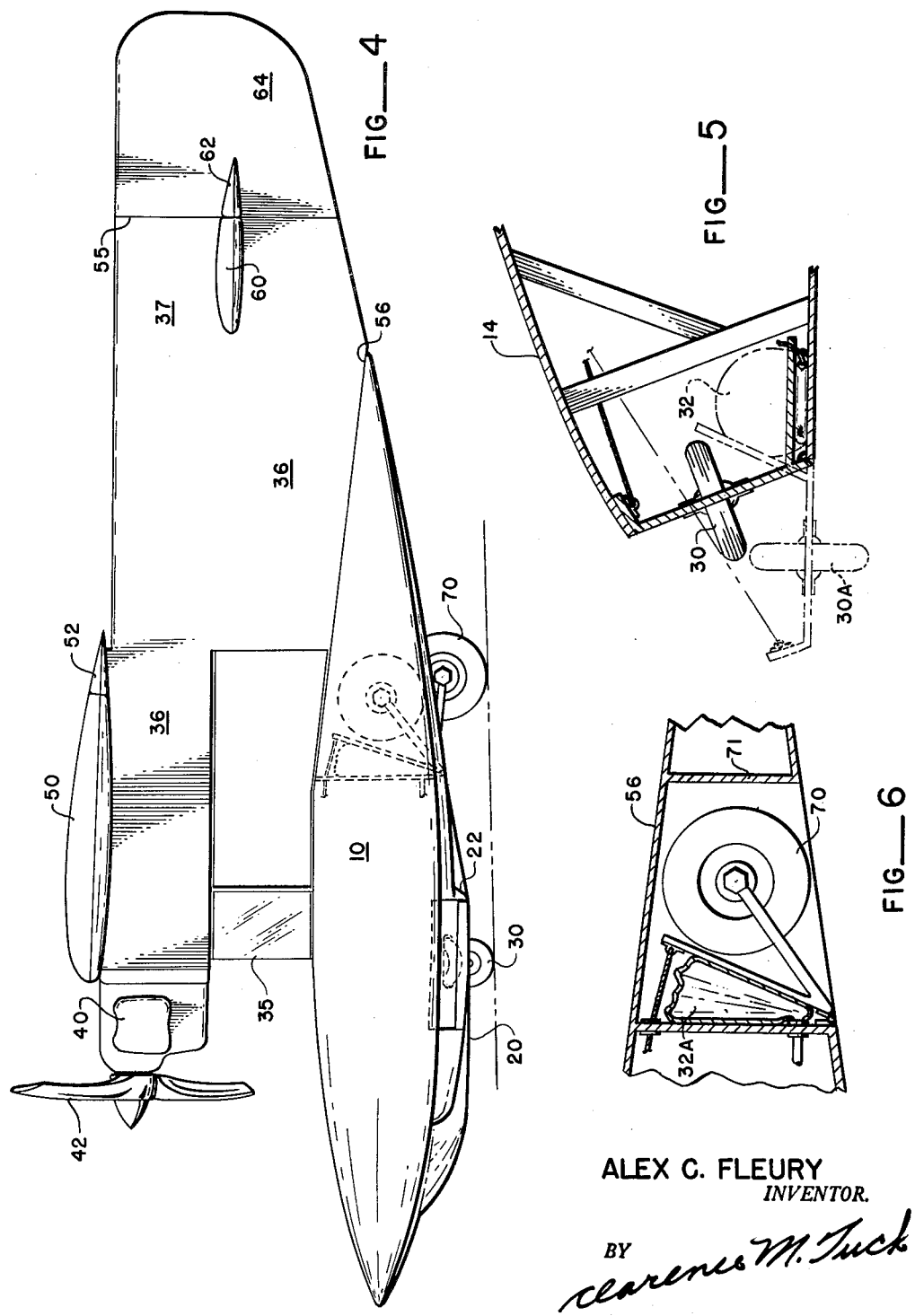

United States Patent Office 3,136,505
Patented June 9, 1964

3,136,505
AMPHIBIOUS AIRPLANE
Alexander C. Fleury, 8200 Wallingford Ave.,
Seattle 3, Wash.
Filed July 24, 1961, Ser. No. 126,144
2 Claims. (Cl. 244—101)

This present invention relates to the general field of lightweight personal aircraft of amphibious design. More especially, this invention relates to an airplane having a single relatively wide planing hull of the type employing marginal planing surfaces which, when the plane is well up in its water-borne speed, gives, in effect, a two-point planing hull.

There has been an insistent demand for personal aircraft of amphibious design which can be manufactured at a moderate or low cost and without the usual weight penalty encountered in this type of aircraft. In my present design I prefer to use a simplified retractable landing gear system which can be kept within the weight of the usual fixed landing gear so commonly employed on small personal planes. In this present construction I provide a substitute for the usual float plane, which in most cases is merely a plane designed for land use on which flotation gear has been installed as an afterthought to make the plane usable on water. Of course, the provision of floats normally precludes the use of ground landing gear in a light plane and the plane is thus restricted for general use. In this present airplane I believe I have further overcome some of the disadvantages of the usual larger or small sized flying boats which traditionally use a relatively deep narrow hull which is lacking transverse stability so that wing floating gear becomes necessary. I have endeavored in this present airplane to make use of many of the best features of existing planes so as to provide an airplane that will have quite general use and which will be light enough so that it may be powered with relatively low powered motors. In my present arrangement the usual fuselage has been so modified that the superstructure extending vertically from the hull and carrying the engine and wing is very narrow giving an aerodynamically clean center section, being no wider at the wing leading edge than is necessary to carry the engine mounts. This modified fuselage is in effect a structural member only, and tapers from a point just forward of the wing and continuing rearwardly and is tapered to form the vertical stabilizer. This structural member supports the rudder and the horizontal stabilizers.

This general arrangement makes it possible to use a single engine of the tractor type with the attendant simplicity of airframe construction and maintenance. The wide hull design with its narrow vertical or fuselage-like portion allows a lower and more efficient thrust line without the complications of a pusher-type installation. The thrust line is lower, or nearer the vertical center of the ship, by virtue of the overall vertical distance being less, due to the hull being much flatter than on comparable ships. This eliminates the awkward vertical turning moment encountered on pylon mounted engines, the pylon also interfering with the smooth flow of air over the upper wing surface.

A principal object of this present invention, therefore, is to provide a combination of structural features which will produce a relatively low cost, safe and efficient personal amphibious airplane for general use.

A further object is to provide a clean upper wing surface of maximum aerodynamic efficiency.

A further object is to provide a relatively wide, two-point planing hull that has sufficient width to provide adequate stability when the plane is at rest on the water.

A further object is to provide a low center of thrust making use of a tractor type forwardly mounted engine.

A further object of this invention is to provide, in the wider hull, an excellent spray protection for the propellor which overcomes one of the disadvantages of many of the present amphibious aircraft, particularly when made in smaller sizes.

Further objects, advantages and capabilities will be apparent from the disclosure in the drawings or may be comprehended or are inherent in the device.

In the drawings:

FIGURE 4 is a side elevation of my airplane showing the same with its wheels retracted and in its normal cruising trim.

FIGURE 5 is a fragmentary, vertical, sectional view taken along the line 5—5 of FIGURE 4 and showing the landing position of the forward wheels when a landing is to be made.

FIGURE 6 is a fragmentary view, partly in section, showing the installation of the rear landing wheel.

Figure 1:
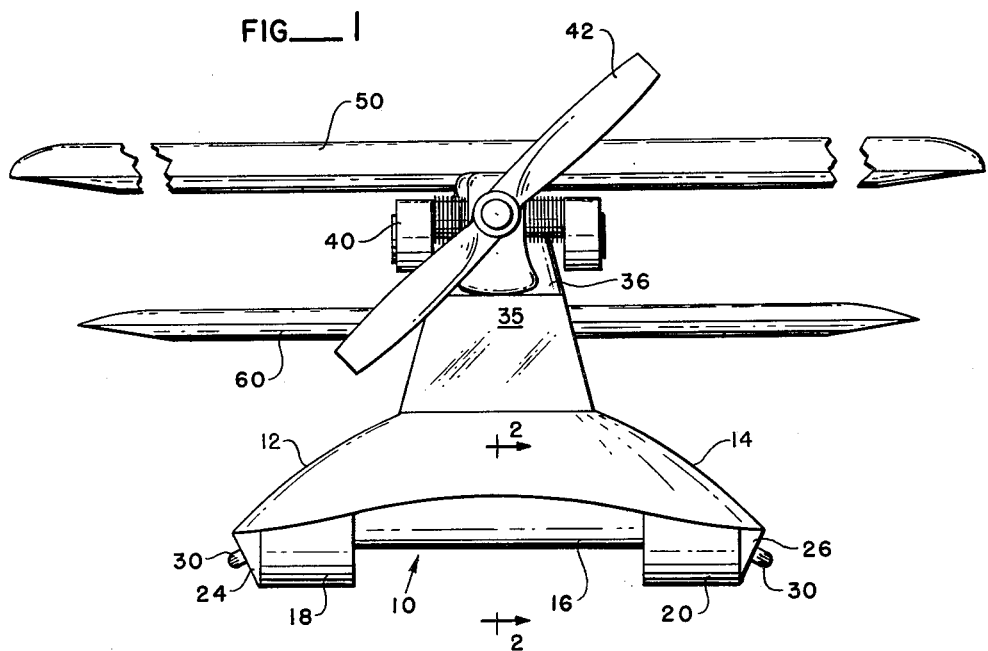
FIGURE 1 is a front elevation of an airplane made after the teachings of this present invention. The wing has been broken away at each end so as to keep the scale of the plane as large as possible.
Figure 2:
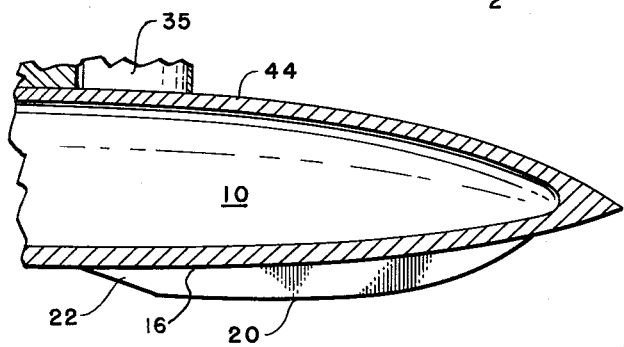
FIGURE 2 is a fragmentary cross-sectional view taken on the line 2—2 of FIGURE 1.
Figure 3:
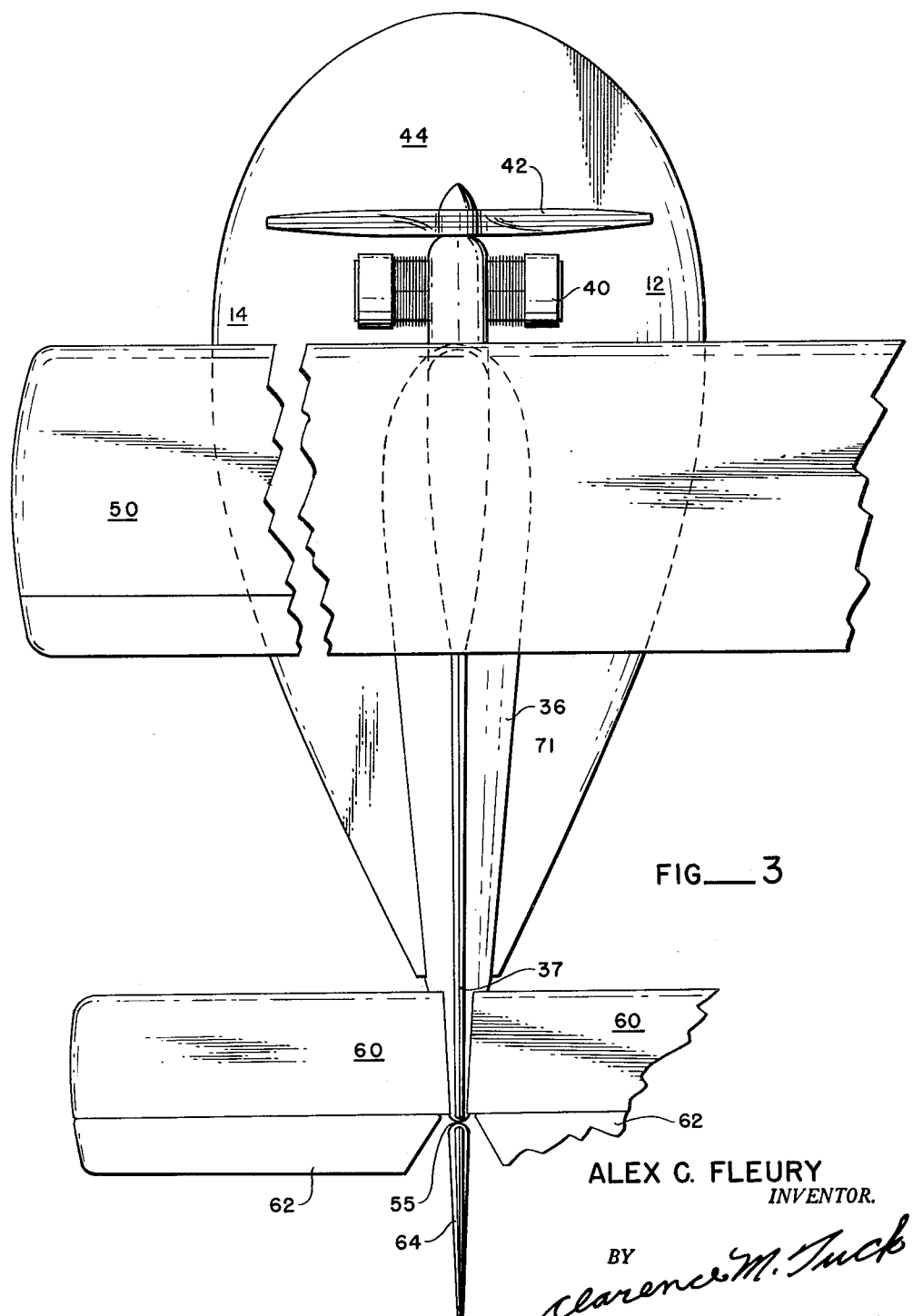
FIGURE 3 is a top plan view of the airplane of FIGURE 1 with the wing, horizontal stabilizer and rudders broken away in part to maintain a relatively large scale.

Referring to the drawings, throughout which like reference characters indicate like parts, the numeral 10 designates generally the boat-like hull that forms the flotation and stabilizing member of my amphibious plane. In FIGURE 2 I have indicated a generally acceptable cellular wall construction which is adaptable to this present type of boat. However, it is believed well within the prerogative of the builder to use any preferred form of hull construction. My concern is that the top view of the hull be relatively wide and this is believed quite accurately shown in FIGURES 1 and 3. Such an arrangement gives adequate longitudinal and transverse stability to the plane as it sits on the water or in taking off or landing, without the need of additional wing tip flotation means. With its planing type bottom, it also provides a very adequate spray shield for the motor, particularly for the propellor and also the windows of the pilot and passenger compartments. In order to obtain a strong transverse section, I prefer to have the upper sides, as 12 and 14, curved substantially as indicated in FIGURE 1 so as to give the maximum strength for a given weight of material and also to provide an aerodynamically streamlined hull. In order to provide adequatae flotation, the main central bottom portion 16 of the boat is relatively wide and this width is increased by the marginal planing surfaces 18 and 20.

Each of the marginal surfaces 18 and 20 is provided with a sloping hydroplane type step 22 at the rear portion thereof to give a clean break with the water bearing the weight of the plane without turbulence. This is most effective in taxying and particularly useful during take-offs. The outer margins of the planing surfaces 18 and 20 are connected to the overhanging top portions 12 and 14 by sloping surfaces 24 and 26. This has three features: one, the added strength obtained from a triangular structure section, the second, the further provision of an anti-trip surface which prevents the hull from digging into the water in case it becomes necessary to make relatively sharp turns either in take-offs or landings and the third is the fact that it also cants the landing wheels downward so that less travel of the extending and retracting gear is needed to operate them.

Referring to FIGURE 5, it will be noted that the relatively small forward landing wheels 30 are mounted in these surfaces and are then easily extended, preferably by flexible air containers or bladders 32, to the dashed line position shown at 30a. Power or manually operated means, not shown, may be employed to supply air under pressure.

The pilot's position is substantially on the plane of and above the line connecting steps 22 to make use of the transparent windshield 35. Vertically disposed frame members connect the hull 10 and the motor mounting central portion of the airplane, indicated generally at 36, with adequate diagonal bracing to accept any thrust between the motor mount and the supporting hull 10. The central portion 36, which may be considered as a modified fuselage as used in the ordinary airplane, in addition to providing a mount for motor 40 which will give propellor 42 adequate clearance from the top surface of the hull, also has the function of positioning and providing center support for wing 50. Additional supporting struts may also be employed.

Wing 50 follows the usual design characteristics of an airplane wing, but in the interest of economy of construction and in furthering my endeavor to provide an inexpensive, lightweight airplane, I prefer that the wing be a straight, horizontal one having the adjustable ailerons as 52 and various other features that have proven desirable by technological development in this fast moving field. A study of FIGURES 1 and 3 will show clearly that there is but a small portion of the under surface of the wing 50 that is engaged by the central fuselage portion 36 which has been found to be a very decided advantage in this structure as with a minimum spread the airplane has a wing of maximum lifting capacity. It will be noted in these figures that the fuselage 36, in addition to providing a streamlined mounting for the vertical rudder 64, has a relatively wide transverse base in engagement with the upper boat surfaces 12 and 14 and tapers vertically so as to reduce the blocking off of the under surface of wing 50.

The central section 36 is carried straight back as viewed from the side in FIGURE 4 to provide the vertical stabilizer 37 and the vertical rear terminal line 55. Also, in my endeavor to provide maximum strength with a minimum of material, the central section 36 is carried down and is structurally secured to the rear top surface 56 of the hull 10. I have also secured the fixed horizontal stabilizer 60 with its attendant pivoted horizontal rudder 62 to the central portion. Following sound airplane construction, the vertical rudder 64 is pivoted at 55 and the elevators 62 are adequately relieved to permit the desirable swing to rudder 64 as required for safe flying or maneuvering on the water. A third landing wheel 70, appreciably larger than the front wheels is housed in the rear of the hull and is retractable by means more fully shown in FIGURE 6.

It must be understood that this ship can be fitted with the main landing gear assemblies which place these wheels 30 forward of the center of gravity and an auxiliary tail wheel 70 aft. All may be retractable. My preferred arrangement however, is one single main landing wheel behind the center of gravity and two auxiliary, or nose gear wheels, forward of the center of gravity. The reasons for this are multiple.

In recent years there has been a trend toward what is termed "tricycle" gear. This is usually two main landing gear located aft the center of gravity of the ship and stressed for all normally landing loads, and a nose wheel forward the center of gravity for purposes of taking taxying and parking loads and for steering purposes. This configuration allows for greater visibility during ground operations as taxying or parking. It also has the great advantage as normally constructed of putting the main wing at a negative angle of attack while on the ground, which means that when the airplane is in the process of landing and any control forces are applied to cause the nose wheel to contact the earth the wing is no longer lifting the plane upward. This makes for a very easy transition from flight to ground roll out. This is the general arrangement preferred for the design of my airplane, except for having one main landing gear aft the center of gravity and two auxiliary or nose gear wheels forward the center of gravity.

It is believed that it will be clearly apparent from the above description and the disclosure in the drawings that this invention comprehends a novel construction of amphibious airplane.

Having thus described my invention, I claim:

1. An amphibious airplane of a light type intended as a personal aircraft, comprising: a single flotation member for supporting said airplane having a width equal substantially to one-half its length; said flotation member having marginal planing surfaces on each side thereof; said surfaces terminating at their rear with a hydroplane type step; a fuselage member tapering in the vertical plane to provide transversely converging sides and terminating in a center support for the wing of the airplane and additionally converging toward the rear of the airplane to provide a thin upper portion forming the vertical stabilizer of the airplane; said fuselage having secured to it the horizontal stabilizers and the vertical rudder; an overhanging curved portion for connecting said flotation member to said fuselage member, the said curved portion conforming at its lower end to the outline of said flotation member and at its upper end to the outline of said fuselage member, a motor operatively secured to the forward end of said fuselage; and retractable front and rear landing gear.

2. An amphibious aircraft as recited in claim 1 in which said retractable front and rear landing gear are operative by means of inflatable bladders positioned between the said flotation member and said landing gear.

References Cited in the file of this patent

UNITED STATES PATENTS

| | | |
|---|---|---|
| 1,748,252 | Sundstedt | Feb. 25, 1930 |
| 2,964,271 | Strawn | Dec. 13, 1960 |